UNITED STATES PATENT OFFICE.

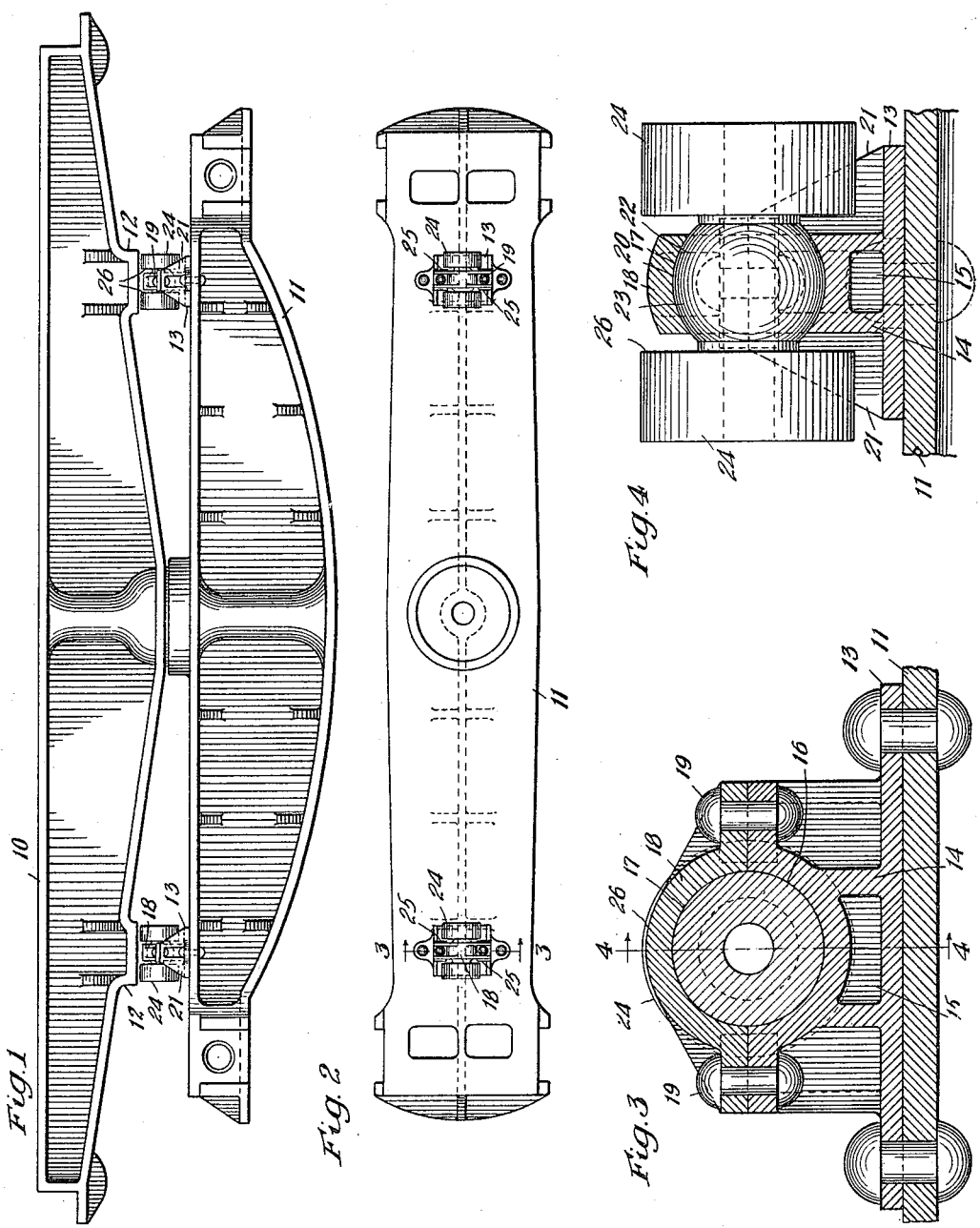

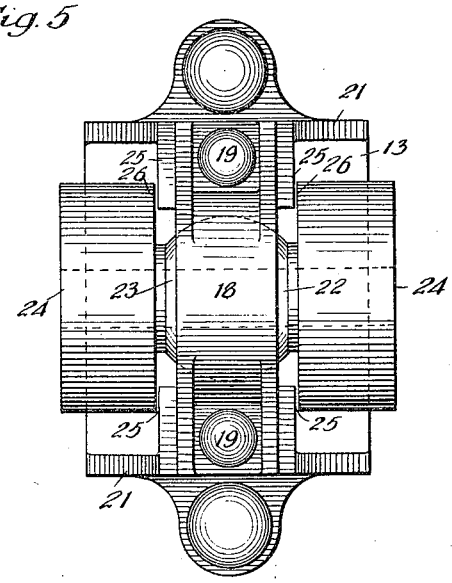

GEORGE A. JOHNSON, OF CHICAGO, ILLINOIS, ASSIGNOR TO WILLIAM H. MINER, OF CHAZY, NEW YORK.

SIDE BEARING FOR RAILWAY-CARS.

1,153,792.  Specification of Letters Patent. Patented Sept. 14, 1915.

Application filed June 12, 1914. Serial No. 844,604.

*To all whom it may concern:*

Be it known that I, GEORGE A. JOHNSON, a citizen of the United States, residing at Chicago, in the county of Cook and State of Illinois, have invented a certain new and useful Improvement in Side Bearings for Railway-Cars, of which the following is a full, clear, concise, and exact description, reference being had to the accompanying drawings, forming a part of this specification.

My invention relates to improvements in side bearings for railway cars.

An object of the invention is to provide an efficient side bearing for railway cars which may be cheaply manufactured and is of durable construction.

In the drawing forming a part of this specification, Figure 1 is an elevation of a car body-bolster and truck bolster, and showing one form of my improvements in connection therewith. Fig. 2 is a top plan view of the truck-bolster showing the side bearings mounted thereon. Fig. 3 is an enlarged vertical sectional view of one of the side bearings taken substantially on the line 3—3 of Fig. 2. Fig. 4 is a similar sectional view taken substantially on the line 4—4 of Fig. 3, and Fig. 5 is an enlarged top plan view of the side bearing.

In said drawing, 10 denotes the body-bolster which is pivotally connected to the truck-bolster 11 in the usual manner. On its under side, the body-bolster 10 is provided with two offsets 12—12 forming bearing plates for the side bearing.

The improved side bearing, as shown, comprises the base plate 13 riveted or otherwise rigidly secured to the truck-bolster as shown, said base plate 13 having an upwardly extending projection 14 hollowed out as indicated at 15, said projection 14 having formed therein on its upper surface, half of a bearing as indicated at 16 in Fig. 3. The other half of the bearing indicated at 17 is formed on the underside of an upper member 18, said members 14 and 18 being securely connected by means of rivets 19 or other suitable means. The bearing formed by the surfaces 16 and 17 is convex as clearly indicated at 20 in Fig. 4 and constitutes a zone of a spherical surface. To properly brace and strengthen the member 14, end webs 21 are provided extending upwardly from the base plate 13.

Mounted in the bearing is a journal member 22 having a spherical surface 23, coöperating with and fitting within the convex bearing provided therefor. The journal 22, carries at each end thereof, an anti-friction roller 24 which, as shown, are of cylindrical form and of the same diameter. On account of the spherical form of the journal and its coöperating bearing, the rollers 24—24 are permitted an oscillatory movement to accommodate themselves to the various positions of the bolsters, and the rollers may be said to be mounted in a universal bearing, since they are permitted to swing in all directions.

In order to limit the amount of movement of the rollers, particularly their movement about a vertical axis, four abutments 25 are provided arranged in pairs on opposite sides of the journal bearing. In normal position the inner faces 26 of the rollers are spaced slightly from the outer faces of the abutments 25 but, as will be apparent, upon the journal 22 being swung about a vertical axis the opposite portions of the inner faces of the rollers will contact with two of the diagonally disposed abutments 25 and prevent excessive swinging movement of the rollers as a unit.

As herein shown, the rollers 24—24 are formed integrally with the journal or axle 22 by which they are carried, thereby making the device one of great strength and one which may be cheaply manufactured.

Various changes and modifications in the construction and arrangement of the parts will readily suggest themselves to those skilled in the art, and I do not wish to be confined to the specific construction described herein, but contemplate the various changes and modifications that come within the claims appended hereto.

I claim:

1. A side bearing of the character described comprising a member provided with a journal bearing having a concave bearing surface, rollers disposed on opposite sides of said bearing and a journal by which said rollers are carried, said journal having a convex surface fitting within said bearing to thereby permit the rollers to have a free oscillatory movement.

2. A side bearing of the character described comprising a member provided with a journal bearing having a concave bearing surface, rollers arranged on opposite sides of said bearing, said rollers being carried by a journal having a spherical surface fitting within said bearing whereby the rollers are permitted to oscillate relatively to the journal bearing, and means for limiting the amount of oscillation of said rollers.

3. A side bearing for railway cars, comprising a supporting member having a journal bearing, the surface of said bearing coinciding with the zone of a sphere and a roller-carrying journal mounted in said bearing, said journal having a spherical surface fitting said bearing.

4. A side bearing for railway cars, comprising a member provided with a journal bearing, rollers disposed on opposite sides of said journal bearing, a journal by which said rollers are carried, said journal being mounted in said bearing, means for permitting said rollers to have bodily oscillatory movement relatively to the bearing and abutments on opposite sides of said journal bearing member with which said rollers are adapted to engage to limit the movement thereof.

5. A side bearing for railway cars, comprising a member provided with a journal bearing, rollers, a journal by which said rollers are carried, and means providing a universal bearing for said rollers.

6. A side bearing for railway cars, comprising a base plate having an upwardly extending portion formed integrally therewith, said portion on its upper surface being shaped to form half a journal bearing, a second member secured to said first named member and provided on its under side with another half of a journal bearing, rollers located on opposite sides of said members, a journal bearing mounted in the bearing provided by said members, said journal having a spherical central portion and being formed integrally with said rollers.

GEORGE A. JOHNSON.

Witnesses:
CARRIE G. RANZ,
ARLINE R. ARNOLD.

Copies of this patent may be obtained for five cents each, by addressing the "Commissioner of Patents, Washington, D. C."